Patented Mar. 23, 1943

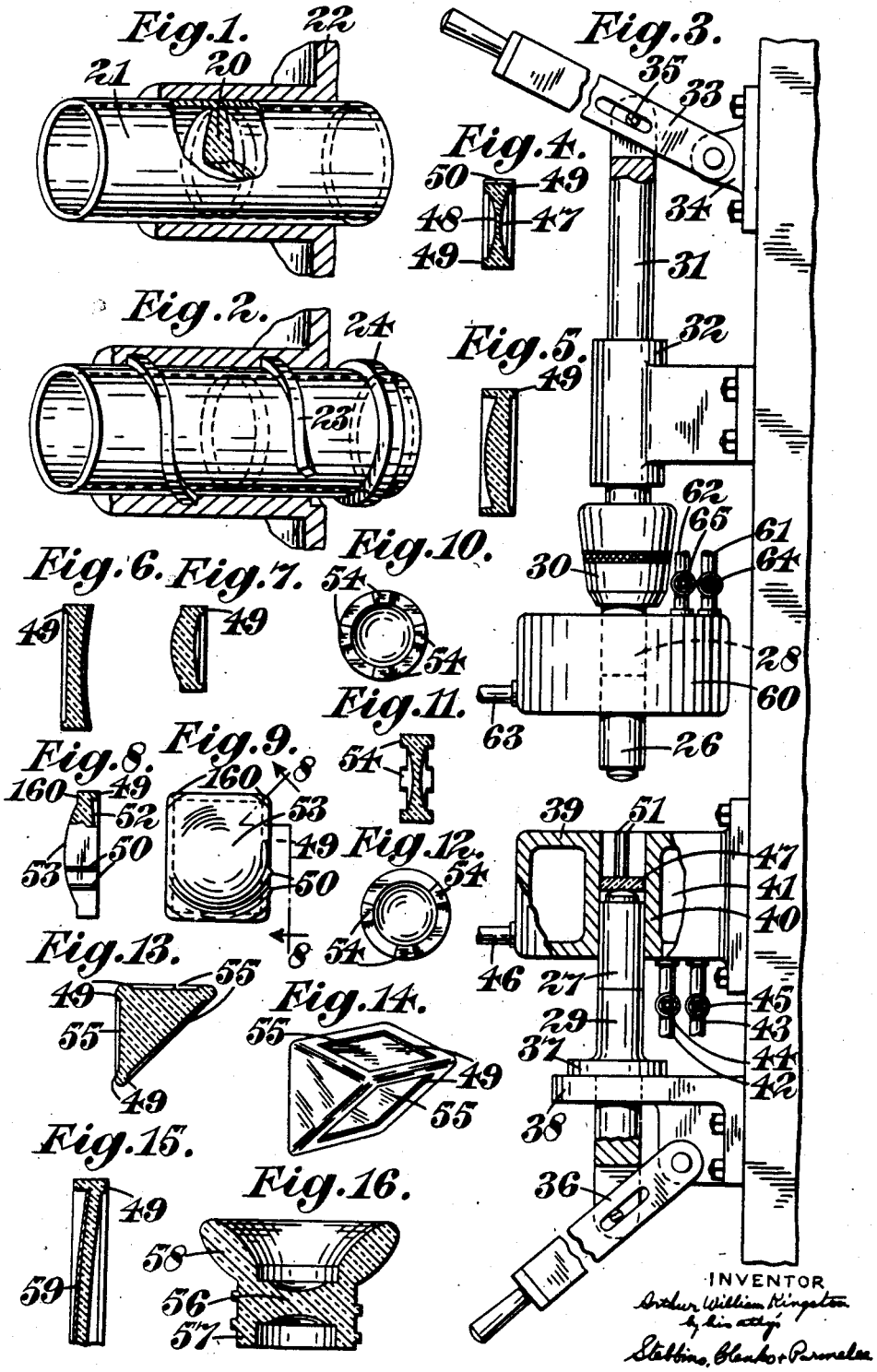

2,314,838

UNITED STATES PATENT OFFICE 2,314,838

OPTICAL LENS AND SIMILAR DEVICE

Arthur William Kingston, London, England, assignor, by direct and mesne assignments, to Combined Optical Industries Limited, London, England Application June 8, 1936, Serial No. 84,170
In Great Britain February 23, 1934

8 Claims. (Cl. 88—57)

This invention relates to a method of manufacturing optical devices for use in instruments of precision and to the devices manufactured in accordance therewith. This is a continuation in part of my application, Serial No. 735,592, filed July 17, 1934.

According to the present invention a method of manufacturing optical devices is characterised in that a transparent thermoplastic material is given by a single moulding operation the shape and highly polished surface necessary for such use by being pressed between dies of known type but having surfaces polished to a degree not heretofore disclosed or practised, such pressing being done at a temperature sufficiently low not to injure such highly polished surfaces of the dies.

According to another feature of the invention there is provided an optical device for use in instruments of precision comprising a moulded structure composed of an organic, plastic, transparent material characterised in that it sets and conforms accurately to the optically polished surfaces of a die.

By "optical devices" I mean lenses, prisms, mirrors and like devices used to refract or reflect light which are suitable for use in instruments of precision such as cameras, field and opera glasses, telescopes, microscopes, projectors and the like, but I do not include lamp glasses, rough lenses or reflectors such as are commonly used in electric torches or other hand lamps where the optical perfection is of small importance and which are therefore not provided with optically polished surfaces.

By "optically polished" I mean having such a degree of polish as is not less than that found upon the surface of glass lenses used in instruments of precision today. The higher the polish the better will be the resulting lens.

By "moulding" I mean any process whereby the required shape in three dimensions is imparted to the raw material by dies exerting a pressure.

By "transparent material" I mean one through which light will pass to a degree comparable with that of ordinary glass.

Transparent materials which are sufficiently plastic to be moulded at a temperature between 100° C. to 150° C. which temperature is sufficiently low as not to injure the optical polish on a die-surface are commercially available today. Such material may be a cellulose derivative or a synthetic resin, and these materials can readily be moulded at the required temperature and there is no distortion in the structure as the material cools. Examples of these materials are a polymerised styrol resin and an acrylic acid resin which are sold respectively under the names of "Trolitul" and "Perspex." Optical devices made of these materials are superior to those made of glass because their transmission of the violet end of the spectrum is high. For example, whereas ordinary crown glass passes only 20% of ultra violet light "Perspex" passes 70%.

Specific embodiments of the present invention will now be described with reference to the accompanying drawing of which—

Figure 1 shows a combined lens and mount;

Figure 2 shows a modified form of combined lens and mount;

Figure 3 is a diagrammatic view of a press for moulding the lenses;

Figures 4–7 are side elevations in section of various forms of lenses;

Figure 8 is a side elevation of yet a further modification partly in section taken along the line 8—8 of Figure 9.

Figure 9 is a front elevation of the modification shown in Figure 8.

Figures 10 and 11 are respectively a front and side elevation of yet a further modification.

Figure 12 is a front elevation of a further modification.

Figures 13 and 14 are respectively a side elevation in section and a perspective view of a moulded prism.

Figure 15 is a side elevation in section of a mirror, and

Figure 16 is a sectional elevation of a combined eye-piece and lens.

As shown in Figure 1, a moulded structure of transparent organic material comprises a lens 20 and a cylindrical mount 21 surrounding the lens 20 and formed integrally therewith. The portions of the surfaces of the dies that form the lens are provided with an optical polish but the portion that forms the mount is not polished and may be provided with a milled or other roughened surface so as to facilitate subsequent staining of the same to produce opacity. The combined lens and mount may readily be introduced into a holder 22 and moved backwards and forwards relatively to the holder for the purpose of focussing. It will be seen that the mount, in addition, constitutes a protecting rim for the lens.

In order to facilitate the movement of the combined lens and mount for the purpose of focussing, the mount may have a screw-thread 23 moulded integrally therewith as shown in Figure 2. The screw-thread 23 is adapted to co-act with a groove in the holder, and a collar 24 is provided to facilitate rotation of the mount and to act as a stop.

A press for moulding the lenses is shown in Figure 3. The press which is secured to a support 25 comprises dies 26 and 27 which are respectively secured to rods 28 and 29. The rod 28 is held in a chuck 30 which is mounted on the lower end of a rod 31, and the rod 31 is adapted to slide up and down in a sleeve 32 which is secured to the support 25. A lever 33 which is pivotally secured to a bracket 34 engages a pin 35 secured to the upper end of the rod 31.

The lower end of the rod 29 is engaged by a lever 36 which is mounted in a similar manner to the lever 33 so that the rod 29 together with the die 27 can be raised when desired. A collar 37 is provided on the rod 29 which engages a plate 38 and acts as a stop to prevent the die 27 from being lowered beyond a predetermined point.

A mould casing 39 which co-operates with the dies is secured to the support 25, and comprises a sleeve 40 which is in register with the dies and which is surrounded by a jacket 41 for steam or cooling water. Inlet pipes 42 and 43 for steam and cooling water respectively are connected to the casing and are each provided with a valve 44 and 45 for controlling the flow of fluid into the jacket. An exhaust pipe 46 for steam and water is provided on the side of the jacket remote from the inlet pipes.

A jacket 60, similar to the jacket 41 surrounding the die 27, surrounds the die 26 and comprises inlet pipes 61 and 62 for steam and cooling water respectively, and an exhaust pipe 63. The inlet pipes are provided with valves 64 and 65 for controlling the flow of fluid in the jacket.

The press is operated as follows: The resin or like material of which the lens is to be moulded is cut into a number of pellets which will fit inside the sleeve 40. The size of each pellet is accurately calculated so that it contains sufficient material for the particular lens which is to be made, without having undue waste material. The steam-valves 44 and 64 are opened so that steam flows through the jackets 41 and 60 and the dies 26 and 27 are heated. A pellet 47 is next placed in the sleeve 40 so that it rests on top of the die 27 which is held by means of the collar 37 about half way up the sleeve 40. The die 26 is then pressed into engagement with the pellet by lowering the lever 33 by hand or with the aid of hydraulic or mechanical means. The die 26 is arranged to engage the pellet with only a light pressure so that the pellet is further heated by the hot die 26 before the full pressure is applied. In addition to ensuring that the pellet has reached the correct temperature for moulding, this method of employing only a light initial pressure obviates the formation of cracks and faults which occur if the full pressure only is applied.

After the light pressure has been applied for a few seconds the full pressure is applied and maintained after the pellet has been moulded until it has been cooled by circulating cooling water through the jacket 41 in place of steam. This follow-up pressure ensures that the moulded pellet is always in contact with the dies until it is cool whereby warping due to the shrinkage caused by the drop in temperature is prevented and the surfaces of the moulded pellet conform accurately to the surfaces of the dies. The initial pressure is preferably of the order of 10% to 20% of the final pressure, for example, a lens of 2 square inches area is moulded with an initial total pressure of 1 ton and a final total pressure of 5 tons.

In order to reduce the displacement of the material, caused by the dies, to a minimum, and thereby to obviate the risk of distortion caused by displacement, the pellets 47 are preferably preformed so as to conform approximately, say within a few thousandths of an inch, to the shape of the article which is to be moulded.

The preformed pellet is provided with a surface which will engage the die near the middle thereof so that the displacement of the material takes place from the middle towards the edges. For example, with a die having a concave spherical surface the pellet is given a convex spherical surface of slightly less radius of curvature. It will be seen that if the pellet had a flat surface or one having a greater radius of curvature than the die, the edges of the die would engage the pellet first and air would become trapped in the space between the faces of the pellet and the die thereby preventing the die from making proper contact with the pellet and consequently impairing the accuracy of the moulding. The present process ensures that all the air is driven out from the space between the surfaces of the die and pellet and ensures that the die makes proper contact with the pellet. Materials such as "Perspex" are usually cast into sheets but they could readily be originally cast into the preformed pellets above described.

When the lens has reached a temperature of the order of 20° C. the die 26 is raised by means of the lever 33 and the finished lens is ejected from the cylinder by raising the die 27 by means of the lever 36. The dies 26 and 27 are made of a steel known commercially as a high chrome steel and they are provided with a degree of polish which is not less than that found upon glass lenses which are today used in instruments of precision. The dies are of complementary shape to the lens surfaces so that the moulded lens has the required shape and polish imparted to it during the moulding operation and is ready for use in an instrument of precision when it leaves the mould, without any subsequent grinding or polishing.

It will be appreciated that any optical devices for use in instruments of precision e. g. lenses, prisms or mirrors can readily be formed in a single moulding operation and that they may be formed integrally with protecting rims or mounts as desired, a feature which has not heretofore been possible owing to the relative movement which has to take place between the grinding tool and the optical device produced thereby. Since the rim or mount does not have to have an optical surface the surface of the sleeve which co-acts with the dies need not be polished and may be of any required shape so as to form screwthreads, milled surfaces, registration devices and the like on the surface of the rim or mount. Examples of some of the devices which can be moulded are shown in Figures 4–15.

The lens shown in Figure 4 comprises two concave surfaces 47 and 48 and a rim 49. The rim projects outwardly beyond each of the optical faces so that the lens may be placed face downwardly on a substantially flat surface with only the rim touching the surface so that the optical faces are not scratched. The rim is preferably provided with one or more projections 50 which may be arranged to co-operate with grooves in the lens-holder to prevent relative rotation between the lens and the holder. As shown in Figure 3, the upper half of the sleeve 40 is provided with recesses 51 which form the projections 50.

Figures 5, 6 and 7 show respectively a planoconvex, plano-concave and a concavo-convex lens formed integrally with a rim 49 which serves to protect at least one of the optical surfaces. Figures 8 and 9 show a double convex lens of rectangular form. The optical surfaces 52 and 53 are spherical so that at each corner of the surface 53 there is provided a flat portion 60 which serves as a seating for a holder. The surface 52 is provided with a protecting rim 49 and one of the edges is formed with projections 50 as above described, which projections are shown as being nearer one corner of the lens than the other so as to ensure that the lens is correctly placed in the mount which will have co-operating recesses.

Instead of forming a continuous protecting rim completely surrounding the optical surface, a number of outwardly-directed excrescences may be provided for the same purpose. As shown in Figures 10 and 11 a lens similar to that shown in Figure 4 may be provided with four equally spaced outwardly-directed excrescences 54 in place of the outwardly-projecting rim 49. It will be seen that these excrescences serve equally well to prevent the optical surfaces of the lens from being scratched and at the same time reduce the amount of plastic material used. The excrescences 54 on one side of the lens may be adapted to register with recesses in the mount and may be arranged as shown in Figure 12, with a different space between each pair of excrescences so that the lens can only be placed in the mount in the correct manner.

A prism, as shown in Figures 13 and 14, may be moulded, by suitably adapting the dies, so that a protecting rim 49 surrounds each optical surface 55 and, as shown in Figure 15, a mirror may likewise be provided with a protecting rim 49, the reflecting surface of the mirror being constituted by a layer of silver upon an optical surface.

The rim which surrounds the optical surface may readily be enlarged to provide a mount for the device and the mount may be so shaped that the whole moulding constitutes a self-contained article. As shown in Figure 16, an eye-piece for field glasses comprises a double concave lens 56, a screw-threaded mount 57, and a tapered portion 58 may be moulded as a unitary article. The mount 57 and the tapered portion 58 constitutes a protecting rim for the lens 56.

I claim:

1. An optical body having an accurate predetermined optical shape formed of a molded transparent resinous material capable of being molded at temperatures not exceeding 200° C. and having two optically polished surfaces produced by the operation of molding the material to the required form by a mold having optically polished molding surfaces, the ultimate polish and contour of each of said first-mentioned surfaces being those imparted to them by the mold.

2. An optical lens having a predetermined accurate optical shape comprising a molded body of transparent resinous material which becomes plastic at temperatures not substantially exceeding 160° C., the surfaces of the lens being optically accurate, and said surfaces being the original intact surfaces formed in the molding operation.

3. An optical device comprising a molded optical body of a transparent organic material having optically accurate surfaces thereon comprising the original surfaces imparted thereto from optically polished and accurately shaped mold surfaces, said device being characterized by having a mount for the optical body projecting axially and laterally beyond some of the boundaries of the optical body and formed integrally with the optical body and of the same material and adapted to provide a support for the optical body in the apparatus in which said body is to be used.

4. An optical device comprising a molded optical body of a transparent organic material having optically polished surfaces thereon comprising the original surfaces imparted thereto from optically polished and accurately shaped mold surfaces, said device being characterized by having a mount for the optical body projecting axially and laterally beyond some of the boundaries of the optical body and formed integrally with the optical body and of the same material and adapted to provide a support for the optical body in the apparatus in which said body is to be used, and integral retaining means on the mount for interfitting engagement with such apparatus.

5. An optical device comprising a molded optical body of a transparent organic material having optically accurate surfaces thereon comprising the original surfaces imparted thereto from optically polished and accurately shaped mold surfaces, said device being characterized by having a mounting edge for the optical body extending longitudinally beyond the optical surfaces of the body and formed integrally with and at the same time as the optical body and of the same material and adapted to provide a support whereby the optical body can be directly introduced into the apparatus in which said body is to be used.

6. An optical device comprising a molded optical body of a transparent organic material having optically accurate surfaces thereon comprising the original surfaces imparted thereto from optically polished and accurately shaped mold surfaces, said device being characterized by having a mount for the optical body projecting radially and longitudinally beyond some of the boundaries of the optical body and formed integrally with and at the same time as the optical body and of the same material and adapted to provide a support whereby the optical body can be directly introduced into the apparatus in which said body is to be used.

7. An optical lens for use in instruments of precision comprising a molded optical body of a transparent organic material having optically accurate surfaces thereon comprising the original surfaces imparted thereto from optically polished and accurately shaped mold surfaces, said lens being characterized by having a co-axial cylindrical mount for the optical body projecting longitudinally beyond an optical surface of the optical body and formed integrally with the optical body and of the same material whereby the mount and optical body are in absolute fixed relation relative to each other, the mount being adapted to provide a support for the body in an instrument of precision.

8. An optical device comprising a molded optical body of a transparent organic material having optically accurate surfaces thereon comprising the original surfaces imparted thereto from optically polished and accurately shaped mold surfaces, said device being characterized by having a mount for the optical body projecting axially and radially beyond an optical surface of the optical body and being thicker than the adjoining edges of the optical body and formed integrally with the optical body and of the same material and adapted to provide a support for the optical body in the apparatus in which said body is to be used, and a screw thread adapted to co-act with a groove in said apparatus.

ARTHUR WILLIAM KINGSTON.